(12) United States Patent
Khoury et al.

(10) Patent No.: US 9,736,860 B2
(45) Date of Patent: Aug. 15, 2017

(54) SYSTEMS AND METHODS FOR SCHEDULING OF A SHARED RESOURCE

(71) Applicant: Raytheon BBN Technologies Corp., Cambridge, MA (US)

(72) Inventors: Joud Khoury, Boston, MA (US); Christophe Jean-Claude Merlin, Malden, MA (US); Dan Alan Coffin, Sudbury, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 195 days.

(21) Appl. No.: 14/813,545

(22) Filed: Jul. 30, 2015

(65) Prior Publication Data

US 2017/0034844 A1    Feb. 2, 2017

(51) Int. Cl.
*H04W 74/04* (2009.01)
(52) U.S. Cl.
CPC ................................. *H04W 74/04* (2013.01)
(58) Field of Classification Search
CPC ......... H04W 72/0446; H04W 72/0486; H04W 72/0493; H04W 72/1252; H04W 72/1257; H04W 72/1263; H04W 72/1268; H04W 74/006; H04W 74/04; H04L 47/125; H04L 47/78–47/788
See application file for complete search history.

(56) References Cited

U.S. PATENT DOCUMENTS 6,965,607 B1 * 11/2005 Landberg .............. H04L 47/781 370/442

| 2012/0271943 A1 | 10/2012 | Chen |
| 2013/0031253 A1 | 1/2013 | Hui |
| 2013/0095770 A1 | 4/2013 | Moshfeghi |

OTHER PUBLICATIONS

Feng, J., et al., "Analysis of Energy Consumption on Data Sharing in Beamforming for Wireless Sensor Networks", 2010 Proceedings of 19th International Conference on Computer Communications and Networks (ICCCN), (2010), 1-6.
Redi, J., "JAVeLEN—An ultra-low energy ad hoc wireless network", Ad Hoc Networks 6, (2008), 108-126.
Siam, M. Z., et al., "Energy-Efficient Clustering/Routing for Cooperative MIMO Operation in Sensor Networks", IEEE INFOCOM 2009, (2009), 621-629.

* cited by examiner

*Primary Examiner* — Pao Sinkantarakorn
(74) *Attorney, Agent, or Firm* — Schwegman Lundberg & Woessner, P.A.

(57) ABSTRACT

Generally discussed herein are systems, apparatuses, and methods for scheduling node access to a shared resource. A method can include determining a position assignment for each of a plurality of nodes to create a ring schedule, the ring schedule defining time frames in which each node of the plurality of nodes has access to a resource that is shared among the plurality of nodes, the ring schedule comprising a plurality of epochs, and each of the plurality of epochs comprising a plurality of positions that define a time at which access to the resource begins, each of a plurality of nodes including a position assignment each epoch, and updating the ring schedule including permuting positions of the ring schedule with the position assignment remaining static or changing at least one position assignment in an epoch of the plurality of epochs.

20 Claims, 8 Drawing Sheets

SYSTEMS AND METHODS FOR SCHEDULING OF A SHARED RESOURCE

GOVERNMENT RIGHTS

This invention was made with Government support under Contract Number W911QX-12-C-0039. The Government has certain rights in this invention.

TECHNICAL FIELD

Embodiments discussed herein relate to devices, systems, and methods for scheduling access to a resource that is shared by a plurality of entities.

BACKGROUND

Scheduling a shared resource can be challenging. Scheduling a shared resource to allow fair access to the resource can be even more challenging. Scheduling the resource to guarantee access to the resource can be even more challenging yet. Many modern scheduling techniques generally include providing an entity with fixed access to the resource without altering a fixed access schedule. If the entity is not able to use the resource to perform all of the operations required within the fixed time period, the operations will need to continue in the next fixed time period. Moreover, if the entity has no task to perform during the assigned time, that entity's scheduled time is wasted.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Embodiments in this disclosure generally relate to scheduling access to a shared resource among a plurality of nodes. The scheduling can include a dynamic slot ring scheduler that either changes a position of a node on the ring or permutes two or more positions on the ring.

Figure 1:
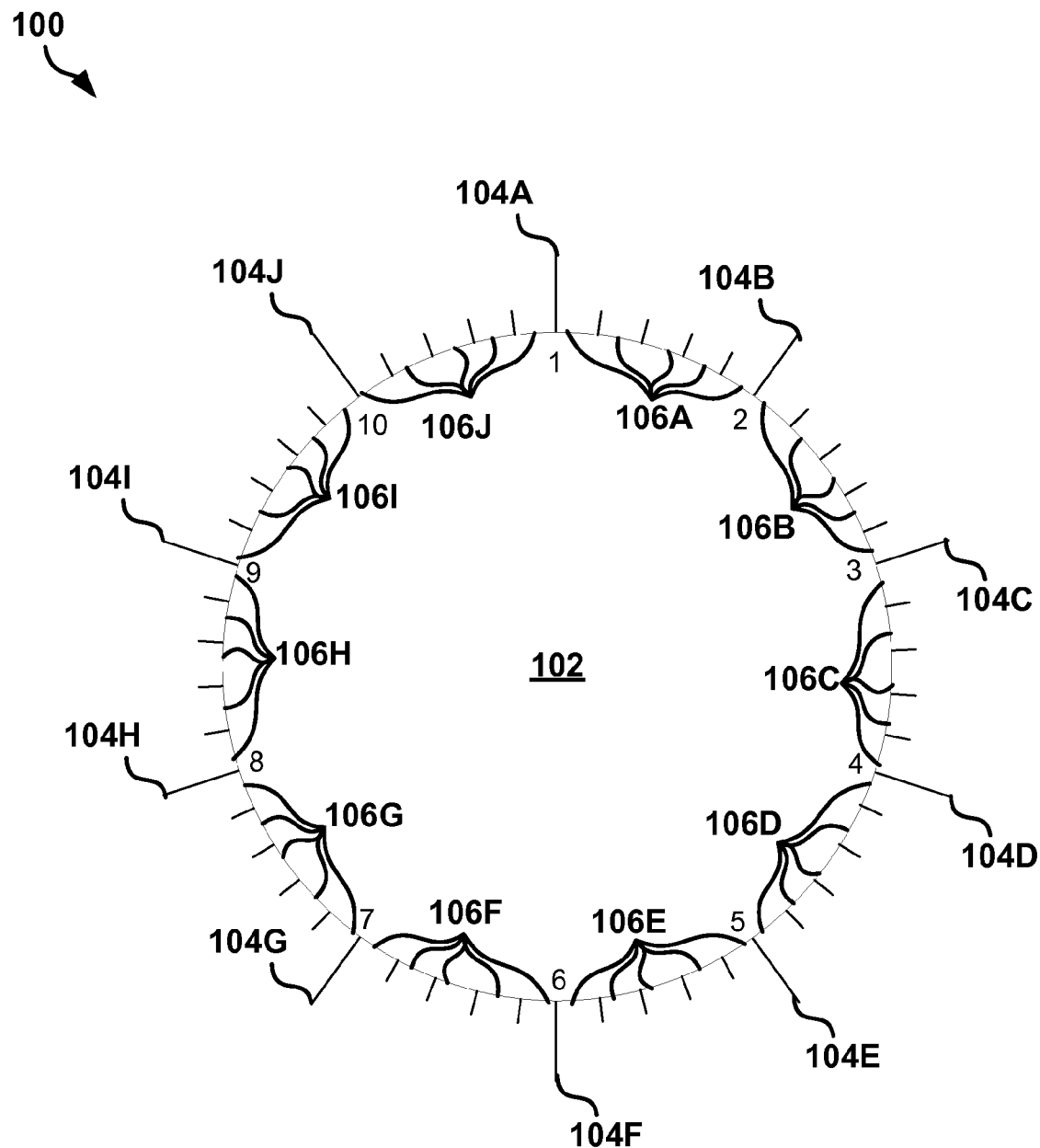
FIG. 1 illustrates, by way of example, a diagram of an embodiment of a ring schedule.

FIG. 1 illustrates, by way of example, a diagram of an embodiment of a ring schedule 100. The ring schedule 100 as illustrated includes a ring 102 of periodic time slots (e.g., sub-seconds, seconds, minutes, hours, days, etc.). The ring 102 represents a repeating schedule of the time slots. Points along the circumference of the ring represent times at which a node can access a resource. The ring 102 is split into positions 104A, 104B, 104C, 104D, 104E, 104F, 104G, 104H, 104I, and 104J. The positions 104A-J represent begin and end times at which a node can be assigned to access the resource associated with the ring schedule 100. The positions 104A-J are further subdivided into groups of one or more slots 106A, 106B, 106C, 106D, 106E, 106F, 106G, 106H, 106I, and 106J. Each of the groups of slots 106A-J represent five slots. A single slot represents a smallest amount of time with which the ring schedule 100 is split. Generally, the slot represents a single frame time that is a smallest amount of time a resource is available for use. Note that, FIG. 1 illustrates each position split into five slots. Note that the positions can be at any slot on the ring and positions do not need to be evenly spaced apart. Thus, the number of positions on the ring schedule cannot exceed the number of slots on the ring schedule. While FIG. 1 shows the ring schedule 102 including ten positions 104A-J, the ring schedule 100 can include two or more positions. While FIG. 1 shows each position 104A-J as including five slots 106A-J, each position 104A-J can include one or more slots and different positions can have the same or a different number of slots between it and the next position. The ring schedule 100 is representative of a single epoch and is generally followed by another epoch including the same number of positions and slots.

Figure 2:
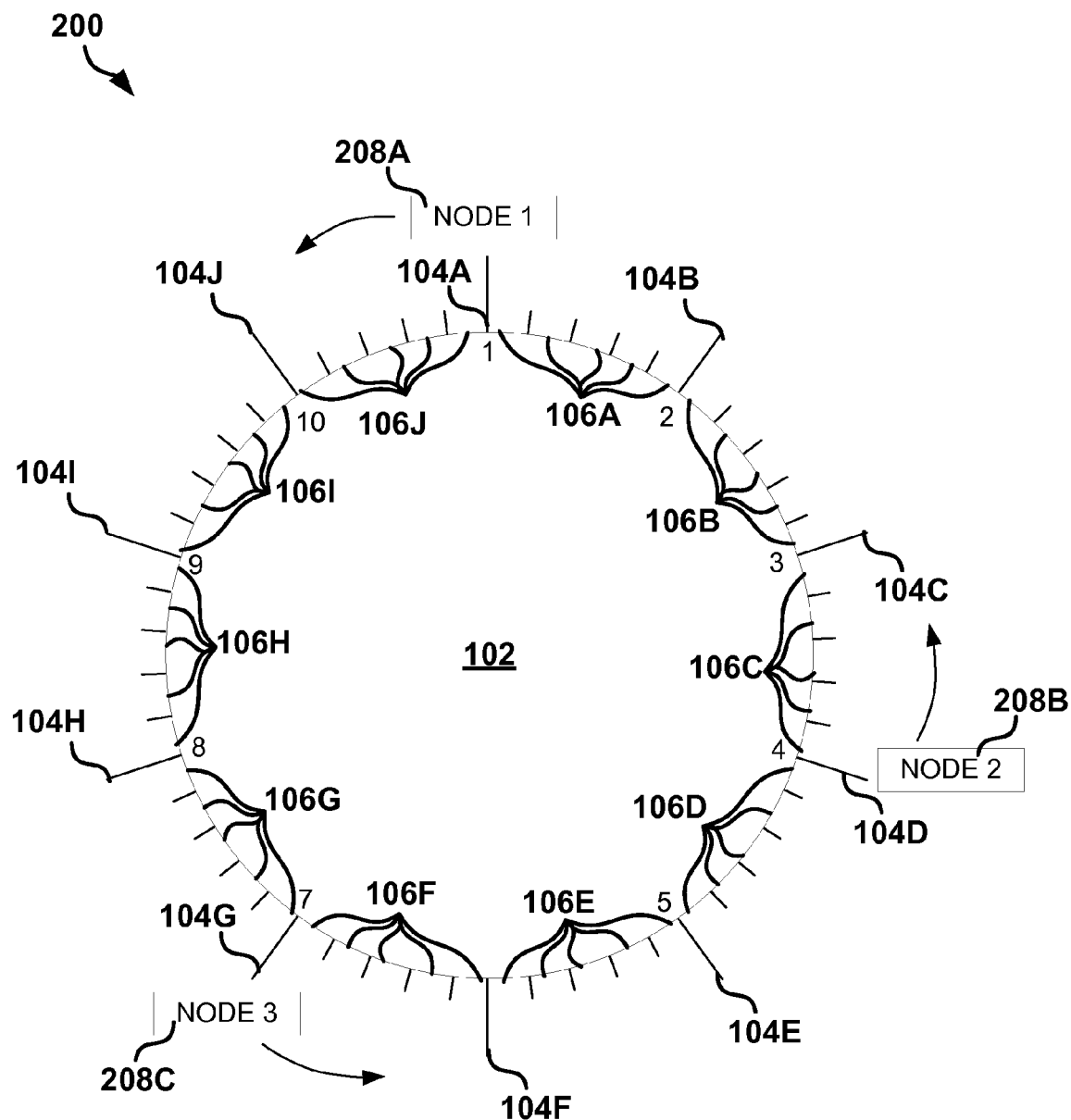
FIG. 2 illustrates, by way of example, a diagram of an embodiment of a ring schedule.

FIG. 2 illustrates, by way of example, an embodiment of a ring schedule 200. The ring schedule 200 is similar to the ring schedule 100 with the ring schedule including three nodes 208A, 208B, and 208C assigned to positions 104A, 104D, and 104G, respectively.

In a fixed slot ring scheduler, the nodes 208A-C access the resource associated with the ring schedule 200 in fixed slots. For example, the node 208A has access to the resource in the slots 106G-J, the node 208B has access to the resource in the slots 106A-C, and the node 208C has access to the resource in the slots 106D-F. In a fixed slot schedule, the locations of the nodes 208A-C on the ring 102 do not change between epochs. Thus, in every epoch the nodes 208A-C have access to the resource in the same, fixed slots. Such a method of scheduling does not account for nodes with changing access demands, or new nodes needing access to the resource, or nodes no longer needing access to the resource. For example, the node 208A may need the resource to perform more operations than the nodes 208B-C at a first time. The node 208B, however, may have a change in circumstance such that it now needs the resource to perform more operations than the node 208A. The fixed slot scheduler does not account for this change in demand. In another example, consider that a fourth node (not depicted in FIG. 2) now needs access to the resource. The fixed slot scheduler also does not account for efficiently adding a node between epochs.

Another drawback to the fixed slot scheduler is the propagation of errors through the schedule. Consider a beam forming application where multiple nodes transmit the same data so as to cause the transmissions to coherently interfere and transmit data of a given node during a specific slot. In such a situation and with a fixed slot scheduler, nodes are generally assigned a same number of slots in a given epoch. To arrive at a consistent schedule among nodes, each node determines how many nodes are transmitting based on control packets received at that node. Consider the nodes 208A-C and assume that there are twelve slots within which to access the resource in the epoch. The node 208A has received a control packet from the nodes 208B-C, the node 208B has received a control packet from the nodes 208A and 208C, and the node 208C has received a control packet from the node 208B. Thus, the nodes 208A-B believes the epoch includes three nodes accessing the resource while the node 208C believes the epoch includes two nodes accessing the resource. The following table summarizes what each node will transmit in each slot in this situation:

TABLE 1

| | SLOT | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| NODE 1 | D1 | D1 | | D1 | D1 | D2 | D2 | D2 | D2 | D3 | D3 | D3 | D3 |
| NODE 2 | D1 | D1 | | D1 | D1 | D2 | D2 | D2 | D2 | D3 | D3 | D3 | D3 |
| NODE 3 | D2 | D2 | | D2 | D2 | D2 | D2 | D3 | D3 | D3 | D3 | D3 | D3 |

In the table "D1" connotes the task to be performed on the shared resource by node 1, "D2" connotes the task to be performed on the shared resource by node 2, and so on. The task can include transmission of data on a specific frequency spectrum, use of a sports facility (e.g., soccer field, baseball diamond, swimming pool, dart board, pool table, bowling alley, etc.), a meeting room, an entire building, or other task that involves an asset, access to which is shared among multiple entities. Note that in the beam-forming application, destructive interference will occur in slots 1-4 and 7-8 and cause packet collisions, because not all nodes are transmitting the same data. Node 3 has computed a different schedule than node 1 and node 2 and node 3 is transmitting different data than nodes 1-2 because node 2 believes there are only two nodes active this epoch and that node 1 is not active. This example is a simple of illustration of how errors can propagate in a fixed slot ring scheduler.

A node is any device or entity that demands access from the resource associated with the ring schedule. The node can be a sensor, a phone, a computer, a transceiver, a person, a team, a business, a combination thereof, or other device or entity that demands access to the functionality of a resource.

To help overcome one or more of the problems discussed, the nodes can compute a dynamic schedule (with or without the help of a centralized scheduler). Nodes can be assigned a deterministic random position on the ring schedule every epoch. In one or more embodiments, the nodes each transmit scheduling data to the other nodes and/or, in some embodiments, to a centralized scheduler. In one or more other embodiments, the nodes each transmit the scheduling data to the scheduler, which then transmits schedule information to the nodes. In such embodiments, the location of one or more nodes on the ring schedule can change efficiently between epochs. Thus, the same node can access the resource in different slots and/or different numbers of slots of consecutive epochs. The following discussion describes a variety of systems, devices, and methods for dynamic scheduling of nodes to a ring schedule.

In one or more embodiments, a node can be assigned a location on a ring schedule (i.e. a position) by using a specified hash function with one or more of an identification (ID) of the node, a demand of the node, and an epoch number of the respective epoch as inputs to the hash function. The hash function maps the input to the number of positions in the epoch. For example, in the ring schedule 200 of FIG. 2, the hashing function maps the input from each node to a number in the set of numbers [1, 2, 3, 4, 5, 6, 7, 8, 9, 10]. The hash function can be known to each of the nodes 208A-C and the scheduler (see FIG. 5) so that each can calculate its position on the ring schedule 200. In an embodiment in which the nodes communicate their input information to each other, that information is sufficient for each node to calculate every node's position on the ring schedule each epoch in a distributed manner. In an embodiment in which the nodes communicate their input information to the scheduler and not to each other, the scheduler can communicate each (other) node's position to each so that all the nodes know all the other nodes' position on the ring schedule and thus can determine in which slots they can access the resource. Alternatively, the scheduler can communicate to the nodes the slots in which the respective nodes are scheduled to access the resource.

Nodes receive the slots contained between their position on the ring and the next position (in either a clockwise or counter-clockwise direction) of a different node as allocation for using the shared resource. Thus, assuming the next position is the position of the next node in the counter-clockwise direction, the Node 1 of FIG. 2 has access to the resource in slots 106G-J.

For example, consider the ring schedule 200 as depicted in FIG. 2. Each of the nodes 208A-C can calculate each other nodes position given the hash function and the relevant inputs to the hash function. To accomplish this, the node 208A transmits its input information to the nodes 208B-C, the node 208B transmits its input information to the nodes 208A and 208C, and the node 208C transmits its input information to the nodes 208A-B. The nodes 208A-C then use the input information for each node to determine that nodes position on the ring schedule and ultimately determine the slots in which the nodes are scheduled to access the resource.

In an embodiment in which the input is only the demand of the node 208A-C, the hash function can help assign positions proportional to the demand of the nodes. The relative proportion of the nodes' demands is given by the following Equation:

$$\text{Proportion of slots demanded} = \frac{r_j}{\Sigma_i r_i}$$

where $r_j$ is a demand from node j for a specified number of slots and $\Sigma_i r_i$ is the total number of slots demanded from all of the nodes i to be scheduled in the epoch. Consider the example of FIG. 2, and consider that the node 208A demands thirty-five slots, the node 208B demands twenty-five slots, and the node 208C demands twenty-five slots. The relative proportion of demands for the nodes 208A-C is [0.42, 0.29, 0.29]. The hash function can then help map (e.g., provide an output that is used to assign) the node 208A to position 1 (position 104A), the node 208B to position 4 (position 104D), and the node 208C to position 7 (position 104G), as is depicted in FIG. 2. Such a node assignment is proportional to the relative demands of the nodes. Using this approach the nodes can be deterministically assigned a position on the ring. One or more of the nodes 208A-C can update their demands prior to the next epoch, and those demands can be used to determine the node assignments.

Mapping nodes to positions on the ring provides benefits in robustness, resilience to loss, adaptation to dynamic requests and demands, all in a distributed manner. Consider a situation in which the node information for the node 208C fails to arrive at node 208B. The node 208A can still determine the position of the node 208C, and the node 208B cannot determine the position of the node 208C. Since nodes receive slots contained between their position and that of the next position of another node in a predetermined direction on the ring, the node 208A receives slots 31-50. Although the node 208B fails to determine the position of the node 208C, this failure does not cause scheduling conflicts since the node 208C is not the next position on the ring relative to the node 208B (in the counter-clockwise direction of the example). Thus, scheduling in this manner can be robust or resilient to control packet loss since packet loss does not necessarily result in conflicts. In the example of FIG. 2, only when the node 208B fails to receive the information from the node 208A does a conflict emerge over the slots 106G-J. Scheduling in this manner is dynamic because a node may change the number of slots in which it can access the resource by changing the number of positions it is assigned, by changing the position to which the node is assigned, and/or by updating a demand for slots.

In one or more embodiments, the hash function can be a random (e.g., pseudo-random) number generator that outputs a number that indicates or can be used to determine which position the node is to be assigned. In one or more embodiments, a random number can be generated for each input variable, the demand, node ID, and/or the epoch number, and those random numbers can be added, subtracted, divided, multiplied, raised to a power (e.g., squared, raised to the third power ($x^3$)), etc., a combination thereof or other mathematical operation to determine a number. That number can then be mapped, such as by the modulo (number of positions+1) operation, to a number within the number of positions to determine the node's position assignment on the schedule.

As not all hash functions guarantee that the node assignments will be unique each epoch, a conflict between node assignments can occur. Conflicts between node assignments (when two nodes are assigned to the same position in a given epoch) can be handled in a variety of ways. In an embodiment in which the scheduler transmits the node positions, the scheduler can determine that there is conflict and assign (e.g., randomly assign) a node to a position that is not subject to a node assignment this epoch. In an embodiment in which the nodes determine the schedule themselves, the nodes can follow a set of rules to resolve the conflict. For example, a node hierarchy can be established. Then, in the event of a conflict, the nodes can look up the relative positions of the nodes subject to the conflict in the hierarchy. The node determined to be lower in the hierarchy can be assigned to a determined open position, such as the next available open position counting up or down from the position in conflict, or other deterministic open position and the node higher in the hierarchy can be assigned to the position in conflict. The hierarchy can include comparing the node IDs of the nodes and listing them from lowest to highest (lowest or highest being highest in terms of the hierarchy) or randomly populating the hierarchy with nodes based on the node IDs.

Table 2 illustrates an example of ten nodes placed in a hierarchy using the rule: lowest node ID is highest in hierarchy.

TABLE 2

| NODE ID | HIERARCHY |
|---------|-----------|
| 39457   | 5         |
| 19473   | 3         |
| 9362    | 1         |
| 87362   | 8         |
| 50938   | 6         |
| 88773   | 9         |
| 10986   | 2         |
| 58993   | 7         |
| 29865   | 4         |
| 98765   | 10        |

In the example of the hierarchy in Table 2, if there is a conflict between the node corresponding to the node ID 58992 and the node corresponding to the node ID 87632, the node corresponding to the node ID 58992 will remain in the assigned position and the node ID 87632 will be assigned to a different, open position if such a position is available.

Figure 3A:
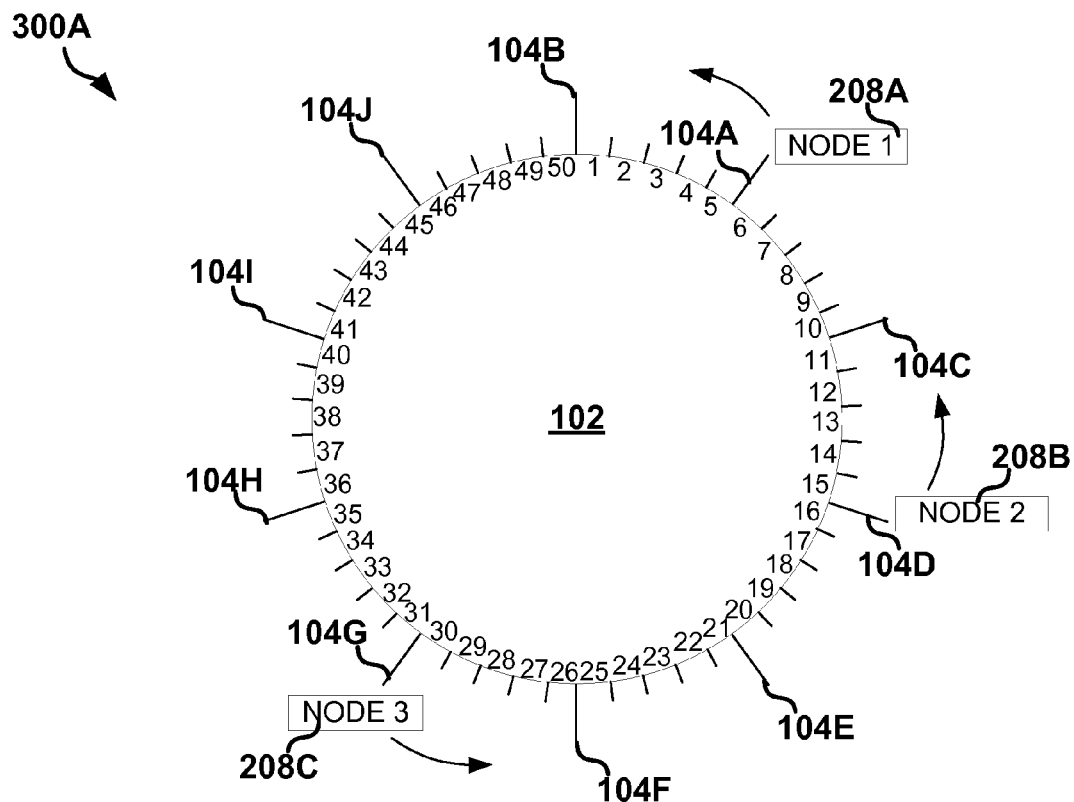
FIG. 3A illustrates, by way of example, a diagram of an embodiment of a ring schedule with positions permuted from the ring schedule of FIG. 2.

In one or more embodiments, a node can be assigned a fixed position on a ring schedule (i.e. a position) by using a specified deterministic function and the location of the positions on the ring can be permuted. As with the previous examples discussed, nodes receive the slots included between their position on the ring and the next position a different node, traveling in a predetermined direction. In one or more embodiments, positions are separated by a fixed number of slots so as to guarantee nodes are assigned to a minimum number of slots every epoch and guarantee minimum access to the shared resource. FIG. 3A illustrates, by way of example, an embodiment of a ring schedule 300A with positions permuted from the ring schedule 200 of FIG. 2. Determining which of the positions to permute can include using an epoch number as an input to a hash function which maps the epoch number to a number (e.g., a random number) within the number of slots of the ring schedule. In the example of the ring schedule of the FIGS. 2 and 3A-3B the number of slots is equal to fifty. Thus, in these examples, the hash function maps the epoch number to a number within, for example, the set of numbers [1, 2, 3 . . . 50]. The positions on each side of the slot corresponding to the number output by hash function can be permuted. For example, if the hash function outputs the number three, the positions on each side of the slot three can be permuted. In the example of the ring schedule, the third slot lies between the positions 104A and 104B. FIG. 3A shows the ring schedule 200 after this permutation to produce the ring schedule 300A. The nodes remained assigned to positions, while one or more of the positions is permuted, so the node 208A remains assigned to the position 104A. This permutation provides the node 208A with more slots of resource time and the node 208B with fewer slots of resource time.

In one or more embodiments, the permutations of node positions on the ring can be determined by a pre-defined sequence of permuting numbers, sometimes modeled as a permutohedron. The sequence can be shared by all nodes and loaded ahead of time. The sequence can be indexed by the epoch number that the node is attempting to schedule.

Figure 3B:
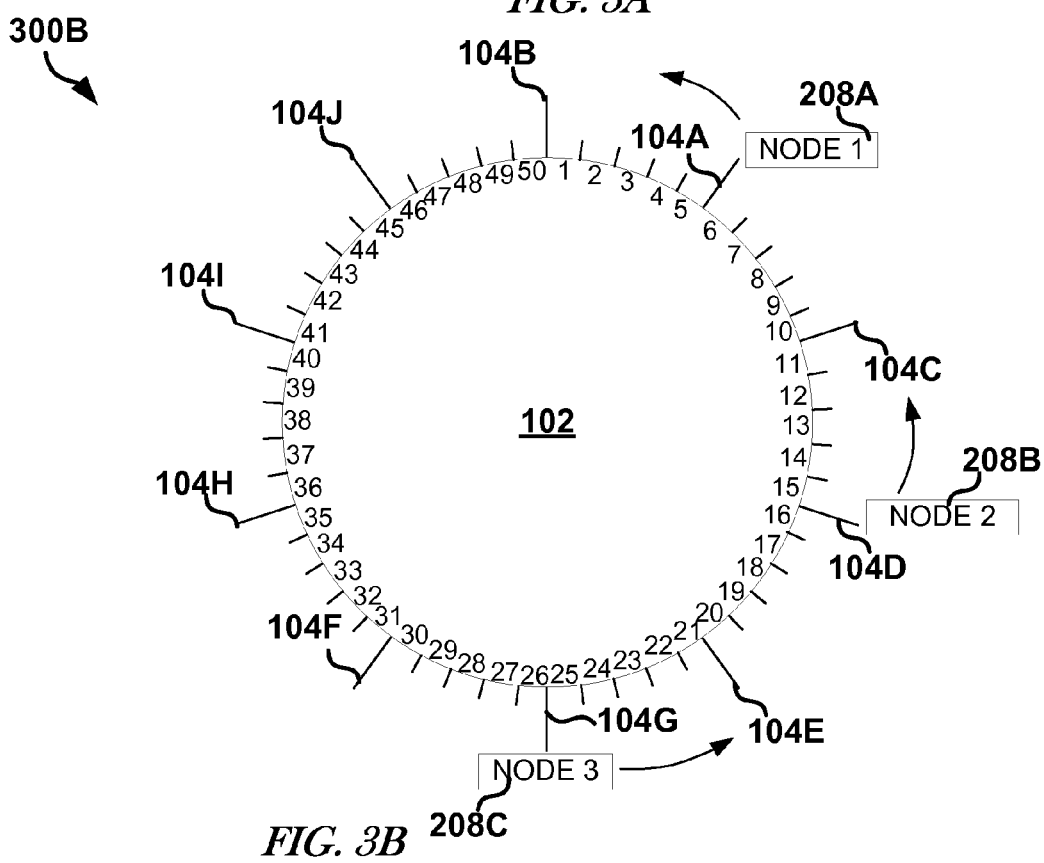
FIG. 3B illustrates, by way of example, a diagram of an embodiment of a ring schedule with positions permuted from the ring schedule of FIG. 3A.

FIG. 3B illustrates, by way of example, an embodiment of a ring schedule 300B with positions permuted from the ring schedule 300A. Consider that for the epoch after the epoch associated with the ring schedule 300A the hash function produces the number twenty-eight. Slot 28 is positioned between the positions six (position 104F) and seven (position 104G). These positions can be permuted, such as is shown in the ring schedule 300B of FIG. 3B. Note that in the examples of FIGS. 3A and 3B the indexes of the slots remain statically increasing clockwise. In the ring schedule 300A of FIG. 3A the indexes of the slots remain counting up clockwise from one to fifty even though two of the position numbers permuted from the ring schedule 200 of FIG. 2. Likewise, in the ring schedule 300B of FIG. 3B the indexes of the slots remained counting up clockwise from one to fifty even though two of the positions permuted.

The slot indexes need not remain static and can "travel" with an associated position or can be changed with a permutation, such as to keep the slot indexes consistent relative to a location of a position to which a node can be assigned.

Figure 4A:
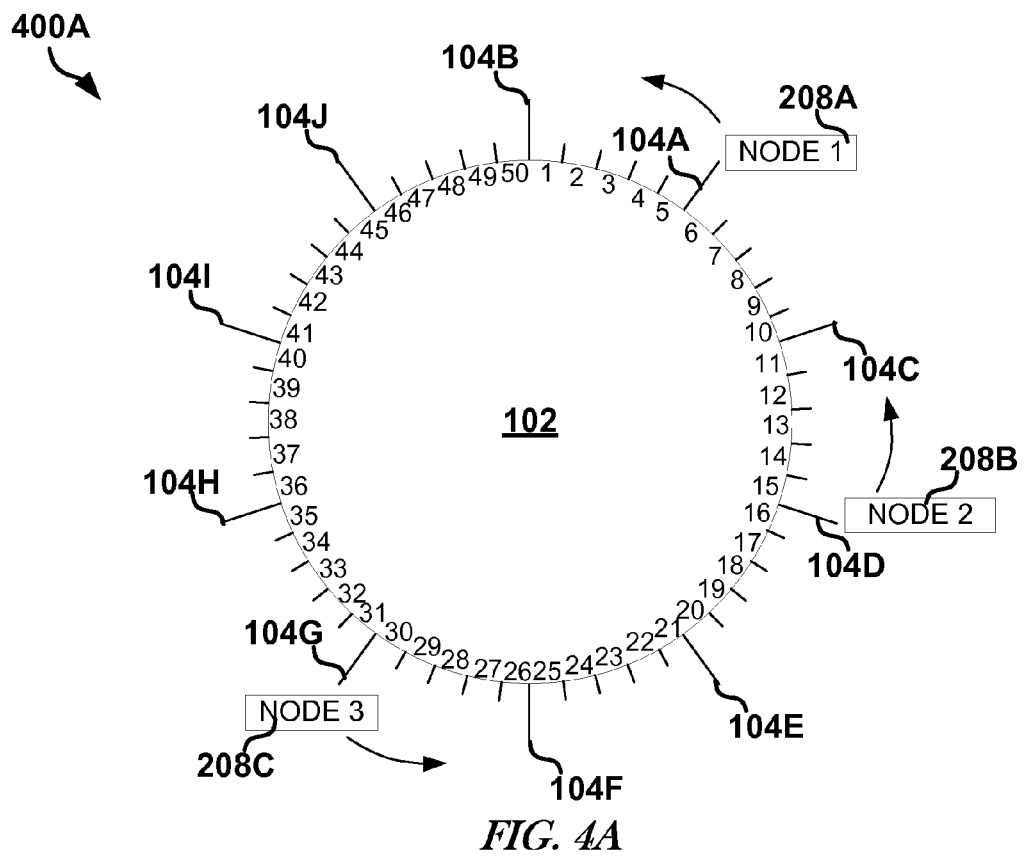
FIGS. 4A and 4B illustrate, by way of example, diagrams of embodiments of ring schedules in which the slot indexes permute with corresponding positions.
Figure 4B:
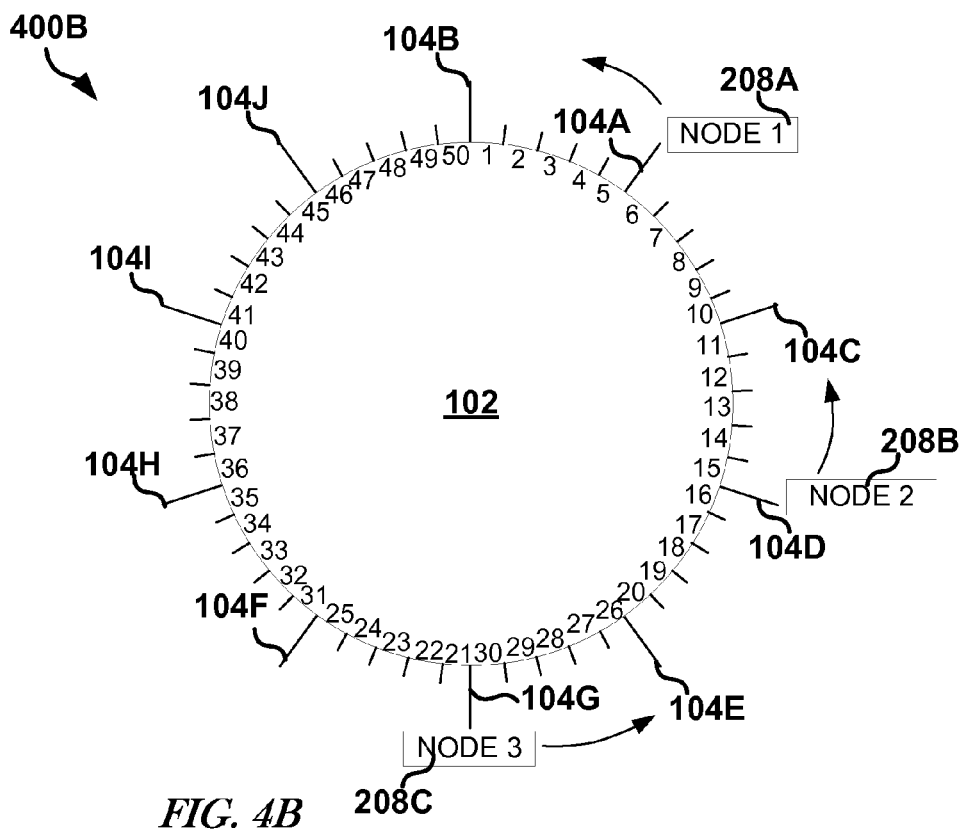

FIGS. 4A and 4B illustrate, by way of example, embodiments of ring schedules 400A and 400B in which the slot indexes permute when a corresponding position permutes. Consider again the examples discussed with regard to FIGS. 3A and 3B, except instead of the slot indexes remaining static clockwise as in the ring schedules 300A-B, the slot indexes travel with a position if the position is permuted. FIG. 4A illustrates that slots 1-4 travel with position 1 and slots 5-8 travel with position 2. With regard to scheduling the slots, the slot times can still occur in order beginning at "twelve o'clock" and rotating clockwise, regardless of the slot index number. Permuting the slot indexes with the position can change which positions are permuted in a given epoch. For example, consider the ring schedule 400A and the ring schedule 400B. If the hash function produces the number twenty-seven after the respective epochs 400A and 400B, the positions 104F and 104G of the ring schedule 400A would be permuted, while the positions 104G and 104E of the ring schedule 400B would be permuted. In contrast, if the slots remained constant the same positions would be permuted.

The node 208A-C may not be receiving sufficient access to the resource even with the permutations of the positions or the mapping of the nodes on the ring schedule. In one or more embodiments, the node 208A-C can create a new node ID that is not duplicative of an ID of an already existing node connected to the scheduler. The new node ID can be transmitted with node information just like it corresponds to a normal node. In one or more embodiments, the nodes 208A-C can map to more than one position along the ring schedule and transmit the number of additional positions to other nodes and/or a centralized scheduler. New positions can be obtained by adding the instance number of the additional position as a new input to the hash function. The node can then be allocated two or more positions on the ring schedule. Such a configuration allows the node an opportunity to gain access to more slots of the resource. A rule can be specified that allows a node to only create a second, third, fourth, etc. node ID or position in pre-defined circumstances. The pre-defined circumstances can include the demand of the node exceeding a defined percentage of the total demand of all nodes, exceeding a defined threshold, or other circumstance.

Figure 5:
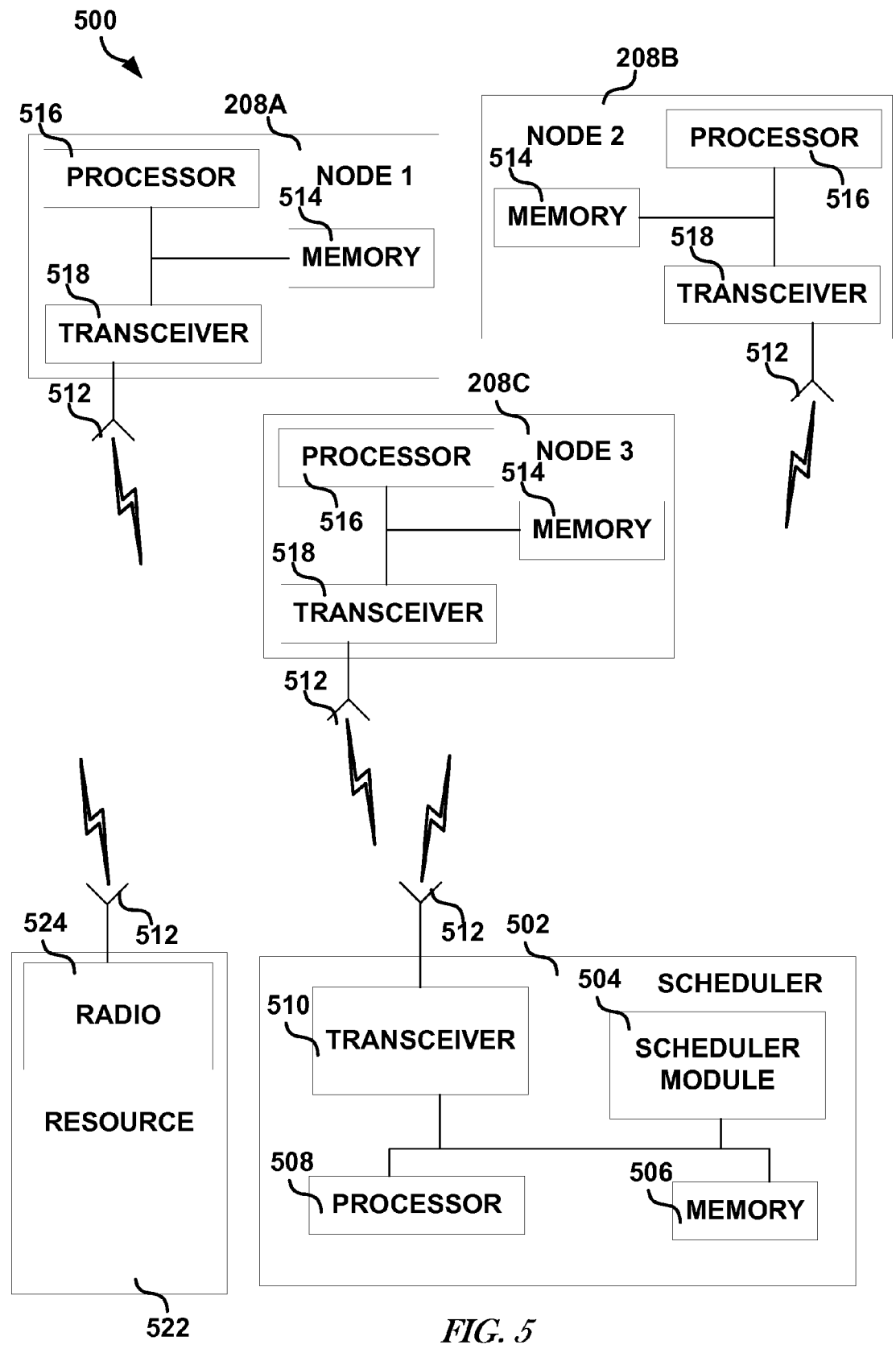
FIG. 5 illustrates, by way of example, a logical block diagram of an embodiment of a system for centralized dynamic and/or adaptive scheduling of a shared resource.

FIG. 5 illustrates, by way of example, a logical block diagram of an embodiment of a system 500 for centralized dynamic and/or adaptive scheduling of a shared resource. The system 500 as illustrated includes a scheduler 502 communicatively coupled to the nodes 208A, 208B, and 208C. The scheduler 502 as illustrated includes a scheduler module 504, memory 506, one or more processors 508, and one or more transceivers 510, communicatively coupled to each other. The one or more transceivers 510 is communicatively coupled to one or more antennas 512. The nodes 208A-C as illustrated each include memory 514, one or more processors 516, and one or more transceivers 518 communicatively coupled to each other. The transceivers 518 are communicatively coupled to the antennas 520.

The scheduler 502 manages the schedule of node access to a resource 522 with which the nodes 208A-C share access. The scheduler 502 includes a scheduler module 504 that performs operations, such as can include a hash function and/or a conflict resolution heuristic, to determine the ring schedule for access to the resource 522. The scheduler module 504 can store the ring schedule in memory and/or provide the schedule to the processors 508. In one or more embodiments, the schedule provided by the scheduler module 504 is provided to the nodes 208A-C through a transmission using the transceivers 510 and the antennas 512. The scheduler module 502, in one or more embodiments, comprises instructions, which when executed by the processors 508, cause the processors 508 to perform the operations detailed by the instructions.

The memory 506 includes data stored thereon that is provided by the processors 508, the transceivers 510, and/or the scheduler module 504. The data can include data indicating a current epoch number, a current ring schedule configuration, such as can include an identification of each of the positions, an identification of each of the slots, node assignments for the current epoch, a demand from each node to be scheduled, an ID of each node to be scheduled, an indication of the position of each position on the ring schedule, and/or an identification of the position of each slot on the ring schedule. The data can be related such that a node ID is related to all the information corresponding to that node, a position is related to all the information relevant to that position, and a slot is related to all the information relevant to that slot, or the like.

In one or more embodiments, the processors 508 can include a hardware processor, such as a central processing unit (CPU) and/or an arithmetic logic unit (ALU). In one or more embodiments, the processors 508 can include processing circuitry that can include one or more logic gates, state machines, transistors, resistors, capacitors, inductors, multiplexors, or other circuitry configured to execute instructions and perform operations based on the instructions.

The transceivers 510 include one or more transmit radios and one or more receive radios. Using the transceivers 510, the scheduler 502 can communicate data to the nodes 208A-C and/or the resource 522. The transceivers 510 can include a half duplex and/or full duplex transceivers.

The antennas 512 are devices used to transmit and receive radio signals. Antennas are made of conductive material that radiates electromagnetic energy when provided with an electromagnetic stimulus. The antennas 512 are radiated by electromagnetic stimulus provided by the transceivers 510.

The memory 514 can include the same data or a subset of the data that is stored on the memory 506. The memory 514 generally includes data stored thereon that is sufficient to convey the current epoch schedule to the node 208A-C.

The processors 516 are similar to the processors 508 with the processors 516 performing the same operations as or a subset of the operations of the processors 508. The transceivers 518 are similar to the transceivers 510 with the transceivers 518 converting electromagnetic radiation from the antennas 512 or the antennas 520 of another node 208A-C to electric signals corresponding too data to be stored in the memory 514 or used by the processors 516 to perform one or more operations.

One or more radios 524 of the resource 522 can be a receive and/or transmit device. The ring schedule determines what times the nodes 208A-C have access to the resource 522 so as to help reduce the negative effects of two nodes accessing the shared resource concurrently, for example, radios transmitting different data to the resource 522 at the same time.

Figure 6:
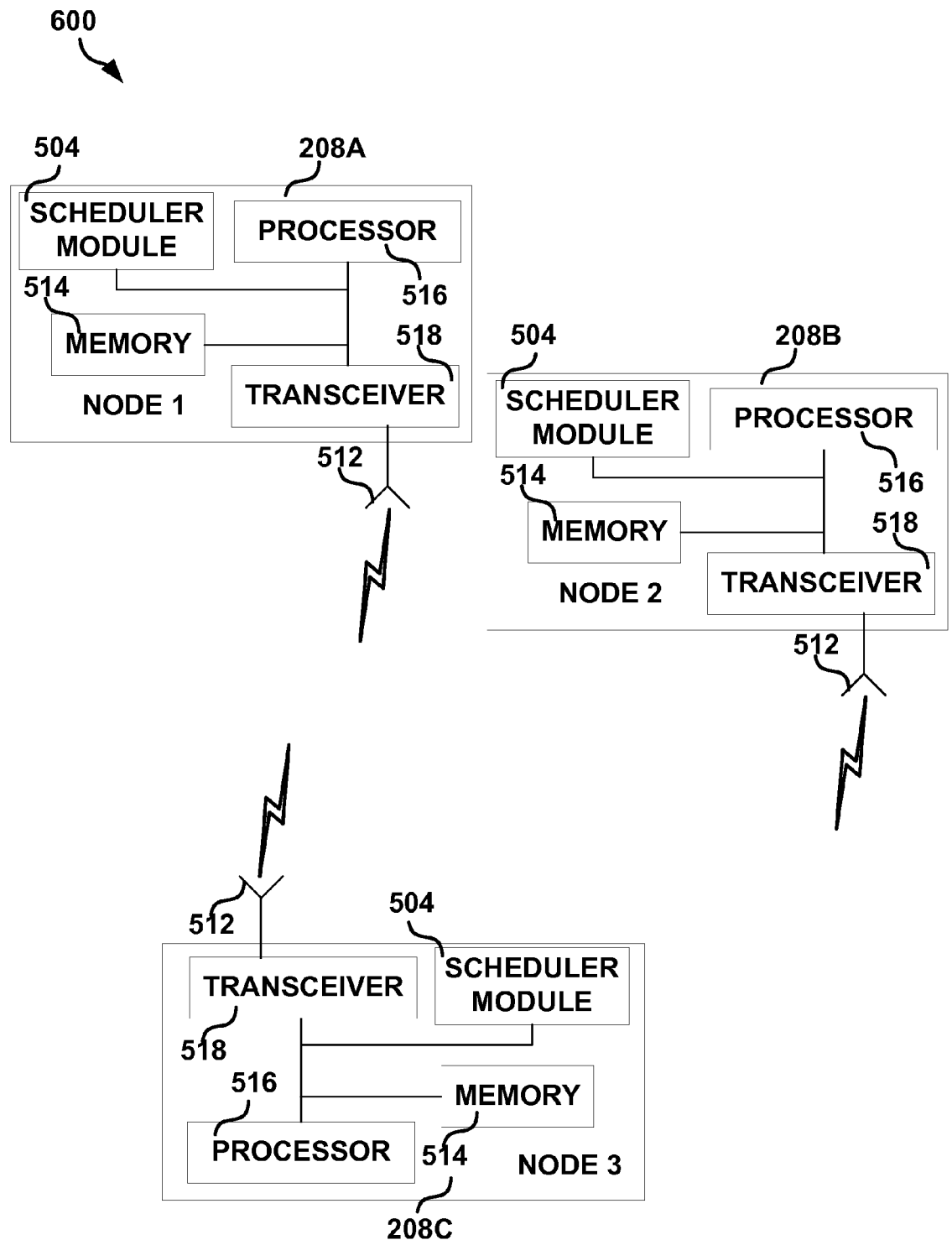
FIG. 6 illustrates, by way of example, a logical block diagram of an embodiment of a system for distributed dynamic and/or adaptive scheduling of a shared resource.

The resource 522 is an asset, access to which is shared by the nodes 208A-C. Note that FIGS. 5 and 6 show the nodes as including hardware circuitry, however, the nodes can be teams, people, or other entities which share access to the resource 522. Some examples of the resource 522 can include a base station, frequency spectrum, a sports field or stadium, a meeting room or other office space, a playground, a swimming pool, a gaming console, or other asset, access to which is shared by multiple nodes. In an example in which a node is an entity and not a device, the entity can use a device, such as a smartphone or a laptop, to transmit schedule data to other nodes and/or the scheduler 502, such that each node can determine the schedule or be provided with the schedule.

A communication from the nodes 208A-C to other nodes 208A-C and/or the scheduler 502 can include schedule data, such as can include a number of nodes to transmit in an epoch, an ID of the node providing the communication, an epoch ID, an end epoch ID, and/or a demand. The demand can be for a number of positions and or a number of slots. The demand can be in the form of data per unit time that can be converted to positions or slots. The epoch ID and the end epoch ID allow a node to specify an ongoing or time-limited demand, so as to help reduce communication between the nodes 208A-C and/or the scheduler 502. In one or more embodiments, if an end epoch ID is not specified the demand can be valid indefinitely or until the node provides an updated demand. A communication from the scheduler 502 can include a number of nodes to transmit in an epoch, one or more IDs of nodes with corresponding position assignments, and/or an epoch ID. The communication from the scheduler 502 can indicate the slots in which the node(s) is scheduled to access the resource.

A node that would like a greater chance of gaining more bandwidth on the resource 522 can provide multiple node IDs or otherwise indicate that it would like more position(s) on the ring schedule (e.g., such as through a position request), each with corresponding schedule data. The node may only be allowed to provide multiple IDs or positions if one or more conditions are met. For example, if the demand of the node exceeds a threshold, or the relative demand of the node compared to the total demand exceeds a threshold, the node may be allowed to create one or more other node IDs and get multiple position assignments on the ring schedule.

FIG. 6 illustrates, by way of example, a logical block diagram of an embodiment of a system 600 for distributed dynamic and/or adaptive scheduling of a shared resource. The system 600 is a so-called "distributed" scheduling system because each node determines the schedule independent of a master device that determines the schedule and transmits the schedule to all pertinent entities as in the system 500 of FIG. 5. Each of the nodes 208A-C of FIG. 6 are similar to the nodes 208A-C of FIG. 5 with the nodes 208A-C of FIG. 6 further including the scheduler module 504. The scheduler module 504 determines resource schedule access that is used by the respective node 208A-C. A distributed scheduler can be less prone to a single point of failure than a centralized scheduler. For example, consider the system 500 and assume that the scheduler 502 becomes inoperative. The resource time would be wasted until the scheduler 502 becomes operable. Now consider the system of FIG. 6 and assume that a node becomes inoperative. The schedule would resume with the remaining nodes accessing the resource based on their determined schedules.

Figure 7:
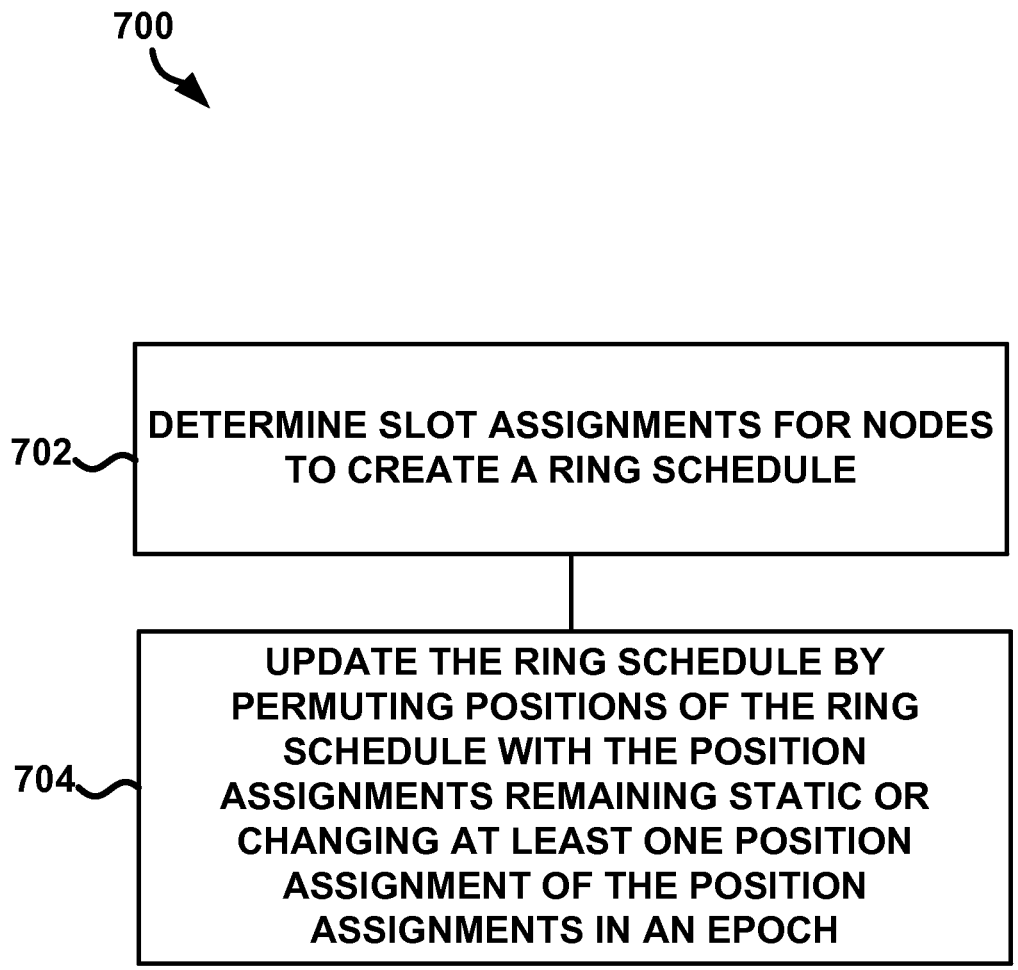
FIG. 7 illustrates, by way of example, a method for adaptive and/or dynamic scheduling of a shared resource.

FIG. 7 illustrates, by way of example, a method 700 for adaptive and/or dynamic scheduling of a shared resource. The method 700 as illustrated includes determining position assignments for nodes to create a ring schedule at operation 702, and updating the ring schedule by permuting positions of the ring schedule with the position assignments remaining static or changing at least one position assignment of the position assignments in an epoch at operation 704. Each of a plurality of nodes can be provided a position assignment each epoch. The ring schedule defines time frames in which the plurality of nodes has access to a resource whose functionality is shared among the plurality of nodes. Each position of the plurality of positions can include one or more slots, each slot of the plurality of slots corresponding to a fixed time in which a node of the plurality of nodes transmits one or more data packets to the resource. Each of the plurality of nodes can be scheduled to access the resource in each slot situated between a respective nodes' position and a position of a closest node to the respective node in a specified direction.

The operation at 704 can include permuting the positions based on a permutohedron or hash function that maps a given number to a set of numbers, a size of the set of numbers equal to a total number of slots of slots in the ring schedule. The given number can be determined using an epoch number of an epoch of the plurality of epochs, a demand from each of the plurality of nodes, and/or a node ID of the plurality of nodes. The operation at 704 can includes permuting two positions of the plurality of positions closest to a slot index of the plurality of slots equal to the given number.

The operation at 704 can include updating the ring schedule using the formula $$\text{Number of Slots to allocate} = \frac{r_j}{\sum_i r_i}$$

where $r_j$ is a demand from node j for a specified number of slots and $\Sigma_i r_i$ is the total number of slots demanded from all of the plurality of nodes i to be scheduled in an epoch of the plurality of epochs. Changing the position assignment of the at least one node of operation 704 can include using a hash function that maps a given number to a set of numbers, the size of the set of numbers equal to the number of positions in the ring schedule. Determining the given number of operation 704 can include determining the given number based on two or more of a node identification (ID) associated with a respective node of the plurality of nodes, an epoch number of the plurality of epochs, and a demand for a number positions from the respective node.

The method 700 can further include receiving a plurality of schedule update requests from a node of the plurality of nodes for an epoch of the plurality of epochs, wherein each request of the request identifies a different node identification (ID) and a demand for a number of positions associated with a respective different node ID. The method 700 can further include assigning each respective different node ID to a position of the plurality of positions on the ring schedule based on the demand associated with the respective different node ID.

Figure 8:
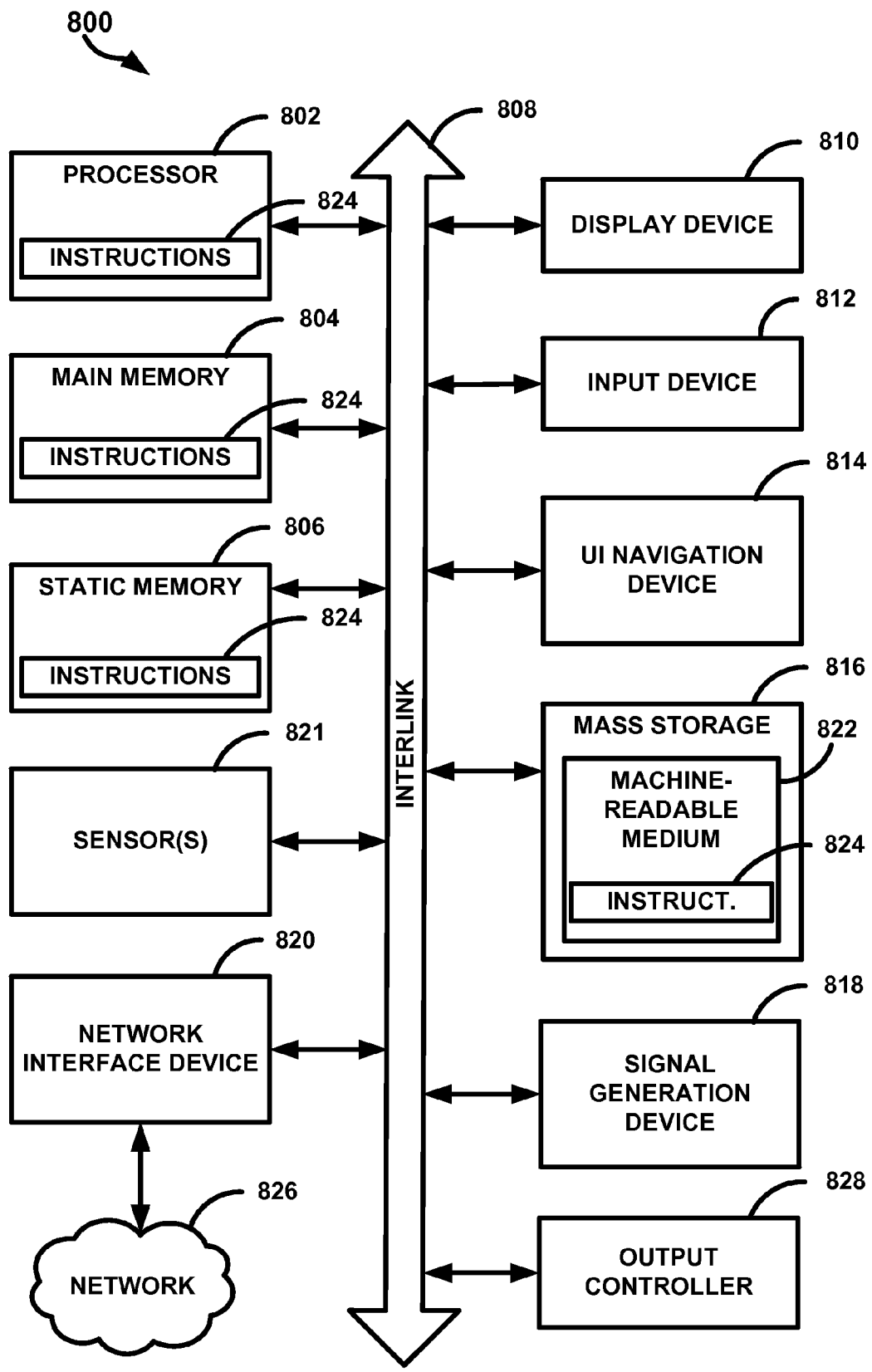
FIG. 8 illustrates, by way of example, a block diagram of an embodiment of a machine on which one or more of the methods as discussed herein can be implemented.

FIG. 8 illustrates, by way of example, a block diagram of an embodiment of a machine 800 on which one or more of the methods as discussed herein can be implemented. In one or more embodiments, one or more items of the scheduler 502, the nodes 208A-C, and/or the resource 522 can be implemented by the machine 800. In alternative embodiments, the machine 800 operates as a standalone device or may be connected (e.g., networked) to other machines. In one or more embodiments, the scheduler 502, the nodes 208A-C, and/or the resource 522 includes one or more of the items of the machine 800. In a networked deployment, the machine 800 may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The machine 800 also includes an alphanumeric input device 812 (e.g., a keyboard), a user interface (UI) navigation device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

As used herein, "communicatively coupled between" means that the entities on either of the coupling must communicate through an item therebetween and that those entities cannot communicate with each other without communicating through the item.

Examples and Additional Notes

Example 1 can include or use subject matter (such as an apparatus, a method, a means for performing operations, or a machine readable memory including instructions that, when performed by the machine, can configure the machine to perform acts), such as can include or use a system for scheduling access to a shared resource, the system comprising a transceiver to receive schedule data from and transmit schedule data to a plurality of nodes and a scheduler communicatively coupled to the transceiver to schedule access to the resource access to which is shared among the plurality of nodes, the scheduler to provide, using the transceiver, schedule update data to each of the plurality of nodes and update a ring schedule detailing node access to the resource, the ring schedule comprising a plurality of epochs with each epoch comprising a plurality of positions and with each of the plurality of nodes including a position assignment each epoch, the update to the ring schedule including permuting positions of the ring schedule with each position assignment remaining static or changing at least one position assignment for an epoch of the plurality of epochs.

Example 2 can include or use, or can optionally be combined with the subject matter of Example 1 to include or use, wherein the scheduler is to update the ring schedule by permuting positions of the ring schedule with each position assignment remaining static.

Example 3 can include or use, or can optionally be combined with the subject matter of Example 2 to include or use, wherein each position of the plurality of positions comprises a plurality of slots, each slot of the plurality of slots corresponding to a fixed time in which a node of the plurality of nodes transmits one or more data packets to the resource, and the scheduler is to update the ring schedule by permuting positions of the ring schedule based on a hash function that maps a given number to a set of numbers, a size of the set of numbers equal to a total number of slots of slots in the ring schedule.

Example 4 can include or use, or can optionally be combined with the subject matter of Example 3 to include or use, wherein the given number is determined using an epoch number of an epoch of the plurality of epochs.

Example 5 can include or use, or can optionally be combined with the subject matter of Example 4 to include or use, wherein the scheduler to permute positions of the ring schedule includes the scheduler to permute two positions of the plurality of positions closest to a slot index of the plurality of slots equal to the given number.

Example 6 can include or use, or can optionally be combined with the subject matter of Example 1 to include or use, wherein the scheduler is to update the ring schedule by changing at least one position assignment in an epoch of the plurality of epochs.

Example 7 can include or use, or can optionally be combined with the subject matter of Example 6 to include or use, wherein each position of the plurality of positions comprises a plurality of slots, each slot of the plurality of slots corresponding to a fixed time in which a node of the plurality of nodes transmits one or more data packets to the resource, and the scheduler is to update the ring schedule using the formula $$\text{Number of Slots to allocate} = \frac{r_j}{\sum_i r_i}$$

where $r_j$ is a demand from node j for a specified number of slots and $\Sigma_i r_i$ is the total number of slots demanded from all of the plurality of nodes i to be scheduled in an epoch of the plurality of epochs.

Example 8 can include or use, or can optionally be combined with the subject matter of Example 6 to include or use, wherein the scheduler is to change the position assignment of the at least one node using a hash function that maps a given number to a set of numbers, the size of the set of numbers equal to the number of positions in the ring schedule.

Example 9 can include or use, or can optionally be combined with the subject matter of Example 8 to include or use, wherein the scheduler is to determine the given number based on two or more of a node identification (ID) associated with a respective node of the plurality of nodes, an epoch number of the plurality of epochs, and a demand for a number slots from the respective node.

Example 10 can include or use, or can optionally be combined with the subject matter of at least one of Examples 2-9, to include or use, wherein the scheduler is to receive a plurality of schedule update requests from a single node of the plurality nodes for a single epoch of the plurality of epochs, wherein each request of the requests identifies a different node identification (ID) and a demand for a number slots associated with a respective different node ID and assigns each respective different node ID to a position of the plurality of positions on the ring schedule based on the demand associated with the respective different node ID.

Example 11 can include or use subject matter (such as an apparatus, a method, a means for performing operations, or a machine readable memory including instructions that, when performed by the machine, can configure the machine to perform acts), such as can include or use determining position assignment for each of a plurality of nodes to create a ring schedule, the ring schedule defining time frames in which each node of the plurality of nodes has access to a resource that is shared among the plurality of nodes, the ring schedule comprising a plurality of epochs, and each of the plurality of epochs comprising a plurality of positions that define a time at which access to the resource begins, each of a plurality of nodes including a position assignment each epoch, and updating the ring schedule including permuting positions of the ring schedule with the position assignment remaining static or changing at least one position assignment in an epoch of the plurality of epochs.

Example 12 can include or use, or can optionally be combined with the subject matter of Example 11 to include or use, wherein updating the ring schedule includes permuting positions of the ring schedule with each position assignment remaining static.

Example 13 can include or use, or can optionally be combined with the subject matter of Example 12 to include or use, wherein each position of the plurality of positions comprises a plurality of slots, each slot of the plurality of slots corresponding to a fixed time in which a node of the plurality of nodes transmits one or more data packets to the resource, and updating the ring schedule by permuting positions of the ring schedule includes permuting the positions based on a hash function that maps a given number to a set of numbers, a size of the set of numbers equal to a total number of slots of slots in the ring schedule.

Example 14 can include or use, or can optionally be combined with the subject matter of Example 13 to include or use, wherein the given number is determined using an epoch number of an epoch of the plurality of epochs.

Example 15 can include or use, or can optionally be combined with the subject matter of Example 14 to include or use permuting positions of the ring schedule includes the permuting two positions of the plurality of positions closest to a slot index of the plurality of slots equal to the given number.

Example 16 can include or use, or can optionally be combined with the subject matter of Example 11 to include or use, wherein updating the ring schedule includes changing at least one position assignment in an epoch of the plurality of epochs.

Example 17 can include or use, or can optionally be combined with the subject matter of Example 16 to include or use, wherein each position of the plurality of positions comprises a plurality of slots, each slot of the plurality of slots corresponding to a fixed time in which a node of the plurality of nodes transmits one or more data packets to the resource, and updating the ring schedule includes using the formula $$\text{Number of Slots to allocate} = \frac{r_j}{\sum_i r_i}$$

where $r_j$ is a demand from node j for a specified number of slots and $\Sigma_i r_i$ is the total number of slots demanded from all of the plurality of nodes i to be scheduled in an epoch of the plurality of epochs in updating the ring schedule.

Example 18 can include or use, or can optionally be combined with the subject matter of Example 16 to include or use, wherein changing the position assignment of the at least one node includes using a hash function that maps a given number to a set of numbers in changing the position assignment, the size of the set of numbers equal to the number of positions in the ring schedule.

Example 19 can include or use, or can optionally be combined with the subject matter of Example 18 to include or use, wherein determining the given number includes determining the given number based on two or more of a node identification (ID) associated with a respective node of the plurality of nodes, an epoch number of the plurality of epochs, and a demand for a number of slots from the respective node.

Example 20 can include or use, or can optionally be combined with the subject matter of Example 8 to include or use receiving a plurality of schedule update requests from a node of the plurality of nodes for an epoch of the plurality of epochs, wherein each request of the request identifies a different node identification (ID) and a demand for a number slots associated with a respective different node ID, and assigning each respective different node ID to a position of the plurality of positions on the ring schedule based on the demand associated with the respective different node ID.

Example 21 can include or use, or can optionally be combined with the subject matter of at least one of Examples 1-120 to include or use, wherein each of the plurality of nodes are scheduled to access the resource in each slot situated between a respective nodes' position and a position of a closest node to the respective node in a specified direction.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system for scheduling access to a shared resource, the system comprising:
    one or more transceivers to receive schedule data from and transmit schedule data to a plurality of nodes; and
    a distributed or centralized scheduler communicatively coupled to the one or more transceivers to schedule access to the resource access to which is shared among the plurality of nodes, the scheduler to provide, using the one or more transceivers, schedule update data to each of the plurality of nodes and update a ring schedule detailing node access to the resource, the ring schedule comprising a plurality of epochs with each epoch comprising a plurality of positions and with each of the plurality of nodes including a position assignment each epoch, the update to the ring schedule including permuting positions of the ring schedule with each position assignment remaining static or changing at least one position assignment for an epoch of the plurality of epochs.

2. The system of claim 1, wherein each of the plurality of nodes are scheduled to access the resource in each slot situated between a respective nodes' position and a position of a closest node to the respective node in a specified direction.

3. The system of claim 2, wherein the scheduler is to update the ring schedule by permuting positions of the ring schedule with each position assignment remaining static.

4. The system of claim 3, wherein:
    each position of the plurality of positions comprises a plurality of slots, each slot of the plurality of slots corresponding to a fixed time in which a node of the plurality of nodes transmits one or more data packets to the resource; and
    the scheduler is to update the ring schedule by permuting positions of the ring schedule based on a hash function that maps a given number to a set of numbers, a size of the set of numbers equal to a total number of slots in the ring schedule.

5. The system of claim 4, wherein the given number is determined using an epoch number of an epoch of the plurality of epochs and wherein the scheduler to permute positions of the ring schedule includes the scheduler to permute two positions of the plurality of positions closest to a slot index of the plurality of slots equal to the given number.

6. The system of claim 2, wherein the scheduler is to update the ring schedule by changing at least one position assignment in an epoch of the plurality of epochs.

7. The system of claim 6, wherein:
    each position of the plurality of positions comprises a plurality of slots, each slot of the plurality of slots corresponding to a fixed time in which a node of the plurality of nodes transmits one or more data packets to the resource; and
    the scheduler is to update the ring schedule using the formula $$\text{Number of Slots to allocate} = \frac{r_j}{\sum_i r_i}$$

where $r_j$ is a demand from node j for a specified number of slots and $\sum_i r_i$ is the total number of slots demanded from all of the plurality of nodes i to be scheduled in an epoch of the plurality of epochs.

8. The system of claim 6, wherein the scheduler is to change the position assignment of the at least one node using a hash function that maps a given number to a set of numbers, the size of the set of numbers equal to the number of positions in the ring schedule.

9. The system of claim 8, wherein the scheduler is to determine the given number based on two or more of a node identification (ID) associated with a respective node of the plurality of nodes, an epoch number of the plurality of epochs, and a demand for a number slots from the respective node.

10. The system of claim 1, wherein the scheduler is to receive a plurality of schedule update requests from a single node of the plurality nodes for a single epoch of the plurality of epochs, wherein each request of the requests identifies a different node identification (ID) and a demand for a number slots associated with a respective different node ID and assigns each respective different node ID to a position of the plurality of positions on the ring schedule based on the demand associated with the respective different node ID.

11. A method for scheduling a shared resource comprising:
    determining a position assignment for each of a plurality of nodes to create a ring schedule, the ring schedule defining time frames in which each node of the plurality of nodes has access to a resource that is shared among the plurality of nodes, the ring schedule comprising a plurality of epochs, and each of the plurality of epochs comprising a plurality positions that define a time at which access to the resource begins, each of a plurality of nodes including a position assignment each epoch; and
    updating the ring schedule including permuting positions of the ring schedule with the position assignment remaining static or changing at least one position assignment in an epoch of the plurality of epochs.

12. The method of claim 11, wherein each of the plurality of nodes are scheduled to access the resource in each slot situated between a respective nodes' position and a position of a closest node to the respective node in a specified direction.

13. The method of claim 12, wherein updating the ring schedule includes permuting positions of the ring schedule with each position assignment remaining static.

14. The method of claim 13, wherein:
- each position of the plurality of positions comprises a plurality of slots, each slot of the plurality of slots corresponding to a fixed time in which a node of the plurality of nodes transmits one or more data packets to the resource; and
- updating the ring schedule by permuting positions of the ring schedule includes permuting the positions based on a hash function that maps a given number to a set of numbers, a size of the set of numbers equal to a total number of slots of slots in the ring schedule.

15. The method of claim 14, wherein the given number is determined using an epoch number of an epoch of the plurality of epochs and permuting positions of the ring schedule includes the permuting two positions of the plurality of positions closest to a slot index of the plurality of slots equal to the given number.

16. A non-transitory machine-readable storage device including instructions stored thereon which, when executed by a machine, cause the machine to perform operations comprising:
- determining a position assignment for each of a plurality of nodes to create a ring schedule, the ring schedule defining time frames in which each node of the plurality of nodes has access to a resource that is shared among the plurality of nodes, the ring schedule comprising a plurality of epochs, and each of the plurality of epochs comprising a plurality positions that define a time at which access to the resource begins, each of a plurality of nodes including a position assignment each epoch; and
- updating the ring schedule including permuting positions of the ring schedule with the position assignment remaining static or changing at least one position assignment in an epoch of the plurality of epochs.

17. The storage device of claim 16, wherein each of the plurality of nodes are scheduled to access the resource in each slot situated between a respective nodes' position and a position of a closest node to the respective node in a specified direction.

18. The storage device of claim 17, wherein the instruction for updating the ring schedule include instructions which, when executed by the machine, configure the machine to change at least one position assignment in an epoch of the plurality of epochs.

19. The storage device of claim 18, wherein:
- each position of the plurality of positions comprises a plurality of slots, each slot of the plurality of slots corresponding to a fixed time in which a node of the plurality of nodes transmits one or more data packets to the resource; and
- the instruction for updating the ring schedule include instructions which, when executed by the machine, cause the machine to use the formula $$\text{Number of Slots to allocate} = \frac{r_j}{\Sigma_i r_i}$$

where $r_j$ is a demand from node j for a specified number of slots and $\Sigma_i r_i$ is the total number of slots demanded from all of the plurality of nodes i to be scheduled in an epoch of the plurality of epochs in updating the ring schedule.

20. The storage device of claim 19, wherein the instructions for changing the position assignment of the at least one node include instructions which, when executed by the machine, cause the machine to use a hash function that maps a given number to a set of numbers, the size of the set of numbers equal to the number of positions in the ring schedule in changing the position assignment, wherein the given number is determined based on two or more of a node identification (ID) associated with a respective node of the plurality of nodes, an epoch number of the plurality of epochs, and a demand for a number slots from the respective node.

* * * * *

UNITED STATES PATENT AND TRADEMARK OFFICE
CERTIFICATE OF CORRECTION

PATENT NO. : 9,736,860 B2  
APPLICATION NO. : 14/813545  
DATED : August 15, 2017  
INVENTOR(S) : Khoury et al.

Page 1 of 1

It is certified that error appears in the above-identified patent and that said Letters Patent is hereby corrected as shown below:

In the Specification

In Column 2, Line 12, delete "1041," and insert --104I,-- therefor

In Column 2, Line 17, delete "1061," and insert --106I,-- therefor

In Column 2, Line 27, delete "102" and insert --100-- therefor

In Column 8, Line 2, delete "520." and insert --512.-- therefor

In Column 8, Line 14, delete "502," and insert --504,-- therefor

In Column 8, Line 60, delete "520" and insert --512-- therefor

In the Claims

In Column 17, Line 19, in Claim 14, after "slots", delete "of slots"

Signed and Sealed this
Fourteenth Day of April, 2020

Andrei Iancu
*Director of the United States Patent and Trademark Office*